United States Patent [19]

Dunn

[11] Patent Number: 4,734,248
[45] Date of Patent: Mar. 29, 1988

[54] CONDUIT ASSEMBLY FOR USE IN A NUCLEAR REACTOR

[75] Inventor: Charlton Dunn, Calabasas, Calif.

[73] Assignee: Rockwell International Corporation, El Segundo, Calif.

[21] Appl. No.: 885,363

[22] Filed: Jul. 14, 1986

[51] Int. Cl.[4] ............................................. G21C 13/00
[52] U.S. Cl. ................................... 376/203; 376/286; 376/404; 285/165; 285/231; 285/302
[58] Field of Search ............... 376/203, 204, 286, 403, 376/404; 285/165, 231, 302, 345, 370

[56] References Cited

U.S. PATENT DOCUMENTS

| 2,712,456 | 7/1955 | McCreery | 285/165 |
|---|---|---|---|
| 4,047,742 | 9/1977 | Haferkamp et al. | 376/286 |
| 4,101,148 | 7/1978 | Lee | 376/286 |
| 4,495,138 | 1/1985 | Thevenin et al. | 376/404 |
| 4,540,204 | 9/1985 | Battle et al. | 285/231 |

FOREIGN PATENT DOCUMENTS

| 431738 | 8/1967 | Switzerland | 376/404 |
|---|---|---|---|
| 2000240 | 1/1979 | United Kingdom | 285/370 |

Primary Examiner—Deborah L. Kyle
Assistant Examiner—Richard L. Klein
Attorney, Agent, or Firm—H. Fredrick Hamann; Harry B. Field; Clark E. DeLarvin

[57] ABSTRACT

A metal conduit assembly for interconnecting the discharge duct of the pump and the inlet coolant duct or reactor core in a pool-type nuclear reactor. The conduit assembly comprises an upper section for connection to the discharge of a reactor pump, a lower section for connection with the coolant inlet duct with reactor core and a third intermediate tubular section for interconnecting the other two sections. Joint means are provided for interconnecting one end of the intermediate section with an adjoining end at the upper section and an opposite end of the intermediate section with an adjoining end of the lower section. The joint means comprises a male portion having a ridge provided with a circumferential groove for receiving a seal means and an associated female portion having an inside diameter greater than that of the ridge for receiving said male portion and a seal means. A key aspect of the conduit assembly is the seal means which comprises a split cylindrical piston ring having overlapping ends to provide for radial expansion and compression of the seal means.

19 Claims, 6 Drawing Figures

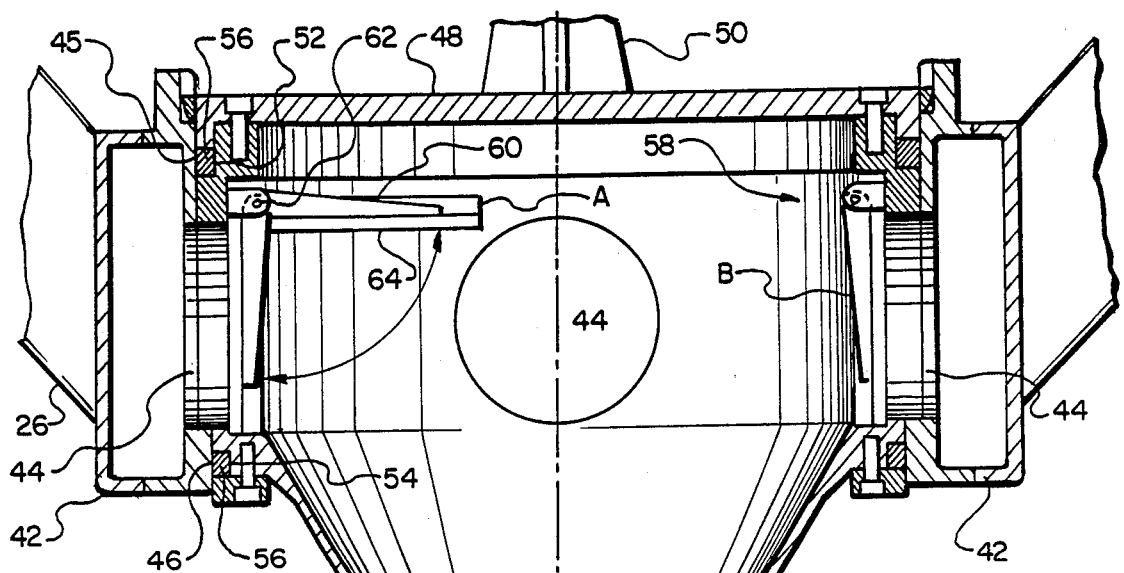
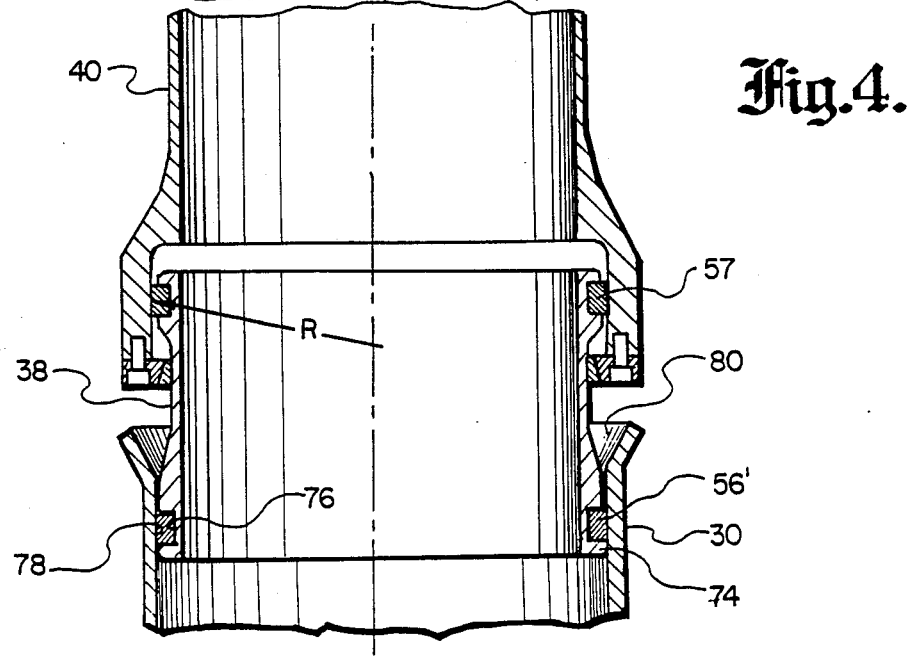
Fig.3.
Fig.4.

CONDUIT ASSEMBLY FOR USE IN A NUCLEAR REACTOR

BACKGROUND OF THE INVENTION

The present invention broadly relates to a conduit assembly for use immersed in a liquid metal. It is particularly directed to a conduit assembly for interconnecting a pump discharge duct and a reactor coolant inlet duct in a pool-type, liquid-metal cooled, nuclear reactor.

The design of conduit assemblies for use in pool-type reactors is very demanding since there is a need for minimizing any stress resulting from thermal expansion and relative movement of the two components being interconnected. In addition, it must be capable of withstanding the calculated stress which would result from a seismic event having a specified magnitude. The problem in the design of such conduit assemblies is further complicated by the fact that the conduit is generally inaccessible for inservice inspection since it is submerged in a pool of liquid metal.

Various types of interconnection have been proposed for use or used in such an environment. For example, it has been suggested that the interconnecting conduit be provided with a bellows to allow for relative motion between the two components as well as thermal expansion of the conduit cell. The disadvantage of the bellows, however, is that it is not readily amenable to removal for inspection and repair if such should be required. Further, the flexing of the bellows could result in work hardening of the metal and subsequent failure of the bellows.

Perhaps the simplest design utilizes a plurality of permanently installed conduits for each pump. The conduits are formed with one or more expansion loops to provide for thermal expansion and the differential movement of the components so interconnected. A disadvantage of this design is, of course, that the pipes cannot be inspected, should such be required, without draining the sodium from the tank. Further, the constant flexing of the expansion loops could result in cracking of the conduit.

Another design concept utilizes a spherical joint at each end of an elongated conduit. The joint comprises a spherical ball in one portion of the conduit in mating engagement with a spherical seat in another conduit to provide for pivotal motion of the conduits. In addition, a cylindrical portion may be provided having a diameter similar to that of the spherical ball to provide for some axial movement. This type of an arrangement may be constructed to be amenable to removal for inspection or repair. A disadvantage of this concept is that it permits a significant amount of leakage; typically from 1 to 10% of the fluid being pumped through the conduit leaks out through the joints. This leakage results from the necessity of providing clearance between the mating metal parts such that they may be remotely installed in or removed from the pool of sodium. The leakage can be minimized, however, only at the expense of maintaining very close tolerances, which is of course both expensive and difficult for large conduits which may be as much as several feet in diameter. In addition, the more closely the tolerances are held to minimize any gaps and leakage, the greater is the possibility that binding between the parts will take place. Any such binding would, of course, defeat the purpose of having movable joints.

OBJECTS OF THE INVENTION

In view of the foregoing, one object of the present invention is to provide a readily fabricatable, uncomplicated conduit assembly for interconnecting a pump and a coolant inlet manifold of a nuclear reactor which conduit assembly is immersed in a pool of a liquid metal coolant.

Another object of the invention is to provide a conduit assembly which is readily removable from a pool of liquid metal for inspection and repair.

Still another object of the invention is to provide such a conduit assembly in which the seals are readily replaceable when required.

It is also an object of the invention to provide such a conduit assembly which does not require precision machining or the maintenance of close tolerances to prevent leakage.

Another object of the invention is to provide such conduit assembly which will allow for pivotal motion, axial motion and rotational motion without imparting stress to the conduit assembly or the parts which it interconnects.

Another object of the invention is to provide an all metal conduit assembly which provides all of the foregoing objects and still permits less than 1% and typically less than 0.5% of the fluid passing therethrough to leak out into the pool of liquid metal.

These and numerous other objects of the invention will be more apparent from the drawings and description thereof.

SUMMARY OF THE INVENTION

The present invention provides an all metal conduit assembly for interconnecting the discharge duct of a pump and the inlet coolant duct of a reactor core in a pool-type, liquid metal cooled, nuclear reactor. Broadly, the conduit assembly comprises three tubular sections. An upper first section adapted for connection to the discharge of a reactor pump, a lower second section adapted for connection with a coolant inlet duct of the reactor core and a third intermediate tubular section for interconnecting the other two sections.

The conduit assembly also includes first and second joint means for respectively connecting one end of the intermediate section with an adjoining end of the upper section and an opposite end of the intermediate section with an adjoining end of the lower section. Each of the first and second joint means includes a male portion having a ridge adjacent an end thereof, a circumferential groove is provided in the ridge for receiving a seal means. An associated female portion has an inside diameter greater than that of said ridge for receiving said male portion and said seal means.

The seal means is radially compressible and has an unrestrained outside diameter greater than that of the inside diameter of the female portion such that it is maintained in contact therewith. The outer periphery of the seal means also is radiused to permit pivotal motion of the tubular sections while maintaining sealing contacts. The joint means further includes means for interlocking the male and female portions together while providing a predetermined amount of axial or pivotal movement. A preferred sealing means comprises a split cylindrical piston ring having a spherical outer surface and which has overlapping ends. Advantageously, the ends are provided with opposed, axially projecting tab means for permitting radially inward compression of the ring while limiting radially outward expansion to assist in the assembly of the joint means.

A third joint means is provided adjacent a lower end of the lower tubular section. The third joint means also comprises a male portion provided with a compressible metallic seal means and a female portion for receiving said male portion and compressible seal means. A preferred sealing means is a split cylindrical piston ring having overlapping ends. Advantageously, the female portion is provided with a radially outwardly flared opening for guiding said male portion into position and compressing said seal means.

BRIEF DESCRIPTION OF THE DRAWINGS

FIG. 3 is an enlarged elevation view in section of the upper half of the conduit assembly of the present invention;

FIG. 4 is an enlarged elevation view in section of the lower half of the conduit assembly of the present invention;

DETAILED DESCRIPTION OF THE DRAWINGS

Figure 1:
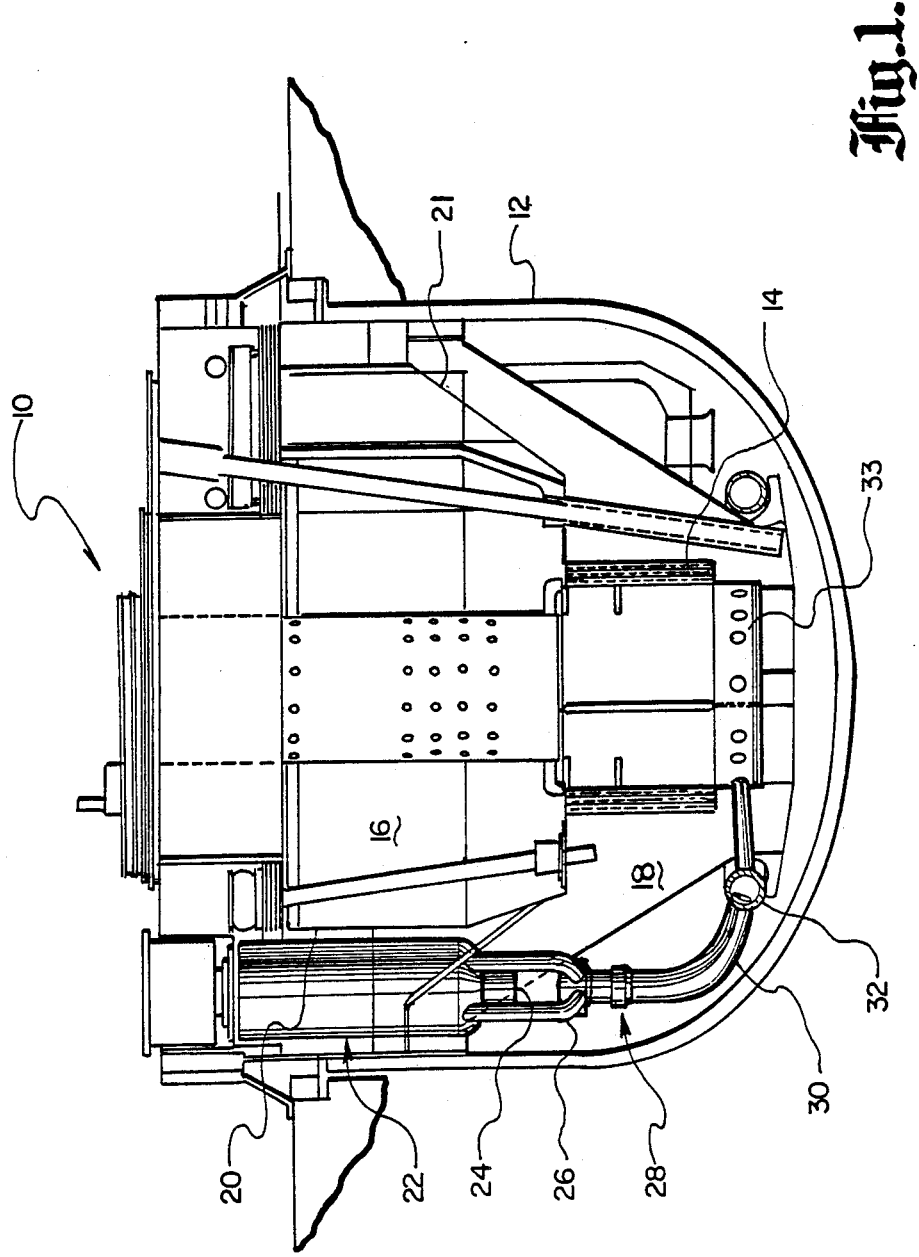
FIG. 1 is an elevation view diagrammatically illustrating pertinent parts of a pool-type, liquid-metal cooled, nuclear reactor including a conduit assembly of the present invention.

Turning now to the drawings wherein like components and features are designated by like reference numerals throughout the various figures, attention is specifically directed to FIG. 1 which illustrates a pool-type, liquid-metal cooled nuclear reactor generally designated by the reference numeral 10. As shown, the reactor includes a containment vessel 12 containing a core barrel 14. Containment vessel 12 is divided into two compartments, 16 and 18 by a barrier generally referred to as a redan 20. Each of compartments 16 and 18 contain a body of liquid metal coolant which typically will be sodium, potassium or a mixture thereof. As shown, reactor 10 also includes a pump assembly 22 which is partially immersed in the liquid metal in compartment 18. Pump assembly 22 has an inlet duct 24 at its lower end and a discharge manifold 26 which terminates in the conduit assembly 28 of the present invention. Conduit assembly 28 is in turn connected to a coolant inlet duct 30 which is permanently installed and in fluid communication with a manifold 32 which distributes coolant to a reactor plenum 33. The liquid metal coolant flows from plenum 33 through reactor core within core barrel 14 where the coolant absorbs heat before entering compartment 16. From compartment 16 the coolant flows through a heat exchanger 21 and then back to compartment 18.

It will be appreciated that the reactor also includes numerous other components and assemblies some of which also will be located within the sodium pool. For purposes of understanding the present invention, however, it is only necessary to understand how the coolant pump is interconnected to the reactor core barrel.

Typically, the distance from the centerline of the core to the pump may be as much as 30 feet and the height of the reactor vessel in excess of 60 feet. Thus, a substantial length of ducting is required to interconnect the pump discharge and the core barrel plenum. The duct must be capable of accommodating mechanical vibration resulting from pump operation as well as seismic disturbance. Further, it must be able to accommodate any stress and distortion induced by the changes of pressure within the duct as well as changes in operating temperature; the latter of which may vary from as low as ambient at start up to about 1000° C. during normal operation. The manner in which conduit assembly 28 accommodates these variations will be more apparent with reference to FIGS. 2 through 6.

Figure 2:
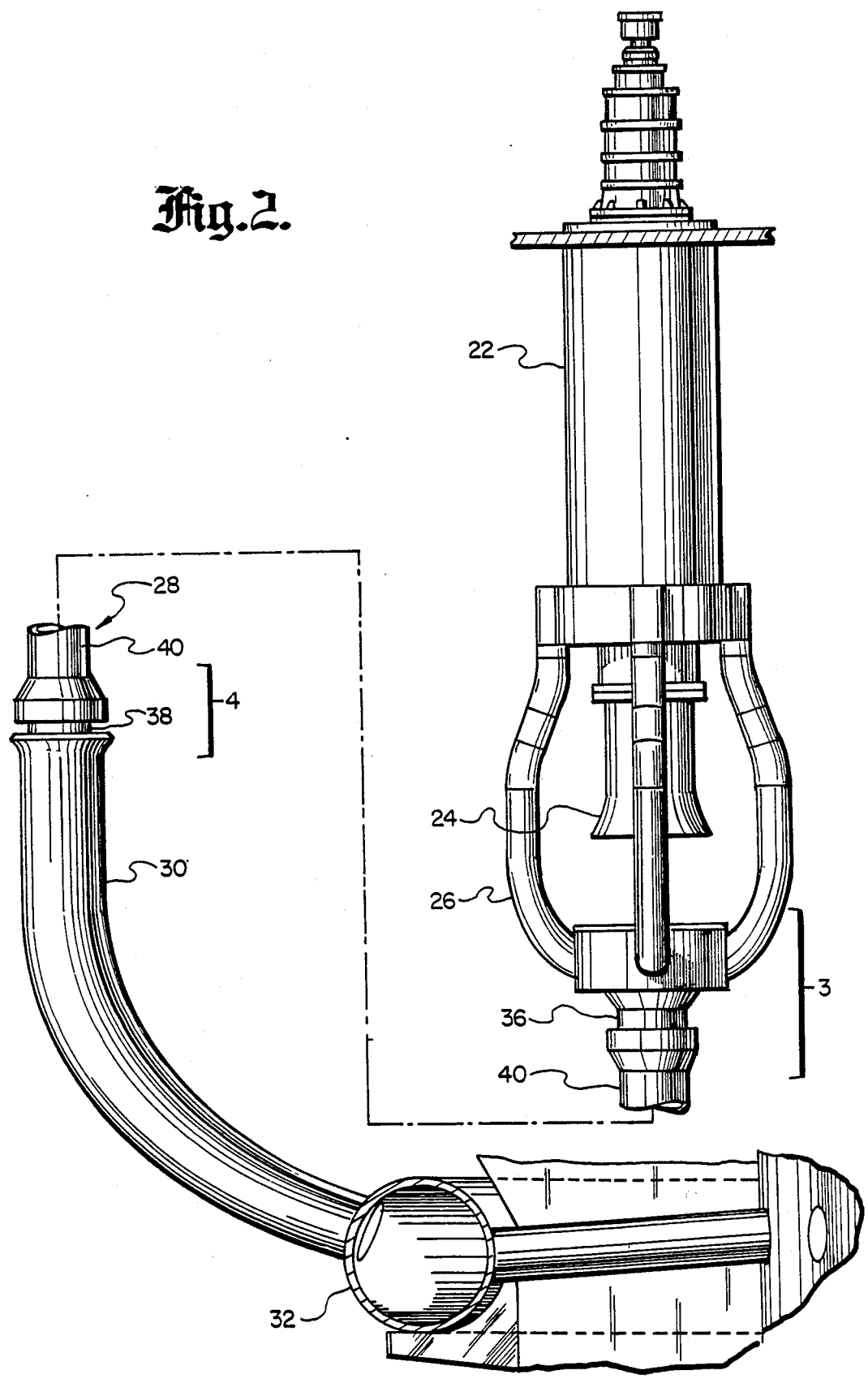
FIG. 2 is an enlarged elevation view showing the conduit assembly of the present invention.

Referring to FIG. 2 in particular, it will be seen that conduit assembly 28 comprises three cylindrical sections. A first upper section 36 connected to the discharge duct 26 of pump assembly 22, a lower second section 38 having a lower end connected to coolant inlet duct 30 and a third intermediate section 40 having an upper end connected to first section 36 and a lower end connected to second section 38.

Referring now to FIG. 3 in particular it will be seen that discharge duct 26 of pump assembly 22 terminates in a substantially cylindrical manifold 42 having a plurality of openings 44. In the particular embodiment depicted, manifold 42 has an inside diameter greater than that of conduit assembly 28 such that conduit assembly 28 may be removed for service, inspection or the like in a manner which will be described later. The inner circumference of manifold 42 includes upper and lower sealing surfaces 45 and 46 respectively. Surfaces 45 and 46 are located about the inside periphery of manifold 42 above and below openings 44. An upper portion of first section 36 of conduit assembly 28 has an upper end adapted for mounting within cylindrical manifold 42. First upper section 36 is closed at its top end by plate member 48 which extends beyond the inner periphery of manifold 42 and rests upon an upper portion of manifold 42 for supporting conduit assembly 28. Centrally located on an upper surface of plate member 48 is a connecting member 50 which provides means for engagement by a grapple. First upper section 36 also is provided adjacent its upper end with two radially disposed grooves 52 and 54 locatd adjacent sealing surfaces 45 and 46 respectively. Located within each of grooves 52 and 54 is a seal means 56.

Advantageously, upper section 36 will also include a check valve assembly 58. In the embodiment depicted check valve assembly 58 comprises an arm member 60 pivotally mounted at its upper end 62 and having affixed thereto a sealing surface 64. During normal operation, the flow of coolant through openings 44 will open check valve assembly 58 as shown in position A. In the event of a pump failure or shut-down, pressure from other operating pumps and/or gravity will cause check valve arm member 60 to drop to a closed position as shown at B such that coolant flow in a reverse direction is substantially prohibited.

Upper section 36 terminates at its lower end in a male portion having a raised ridge portion 66. Located within the outer periphery of ridge portion 66 is a circumferentially extending groove 68 in which is located another seal means 57.

Seal means 57 is in contact and sealing engagement with an interior female sealing surface 70 of intermediate section 40. Advantageously, surface 70 is provided with a spherical radius R to accommodate pivotal misalignment between sections 36 and 40. The upper end of intermediate section 40 also is provided with removable flange members 72 which typically will be in two or more removable sections for ease of installation. There also is provided a shoulder 74 which together with flange member 72 limit the amount of axial movement of ridge 66 and seal means 57 along surface 70. Intermediate section 40 is connected at its lower end to a lower section 38 in an identical manner. It will be appreciated of course that either of the male and female portions of each section could be reversed.

The lower end of section 38 terminates in a male portion having a circumferentially extending ridge portion 74 which has an annular recess 76. Located within annular recess 76 is a seal means 56' which is in sealing engagement with an inner surface 78 of an upwardly extending portion of coolant inlet duct 30. Advantageously, the upper end of coolant duct 30 terminates in a radially outwardly flared portion 80 which has an inside diameter at its uppermost terminal end which is greater than that of the unrestrained diameter of seal means 56' to act as a guide to facilitate insertion of the lower end of lower section 38 into duct 30.

Figure 5:
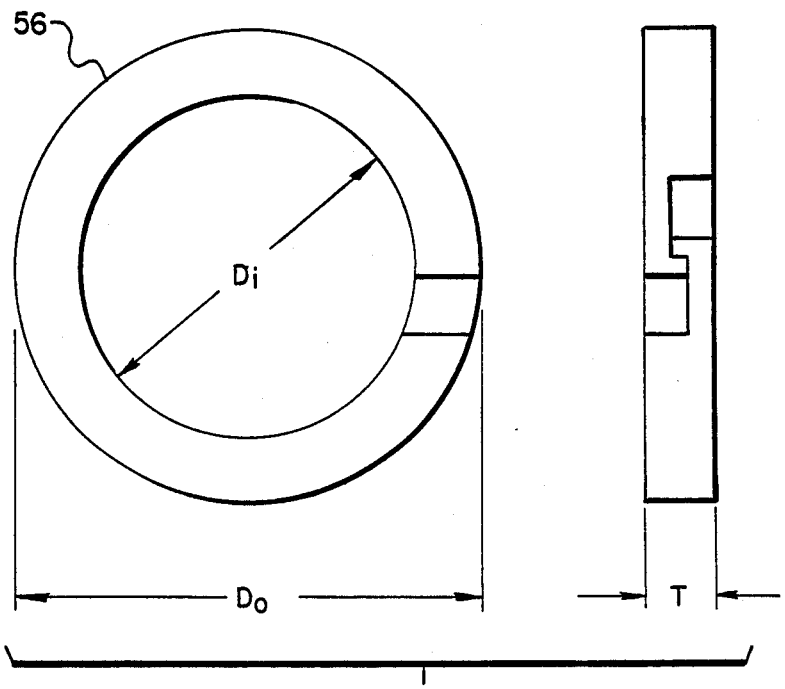
FIG. 5 is one seal means of the present invention.
Figure 6:
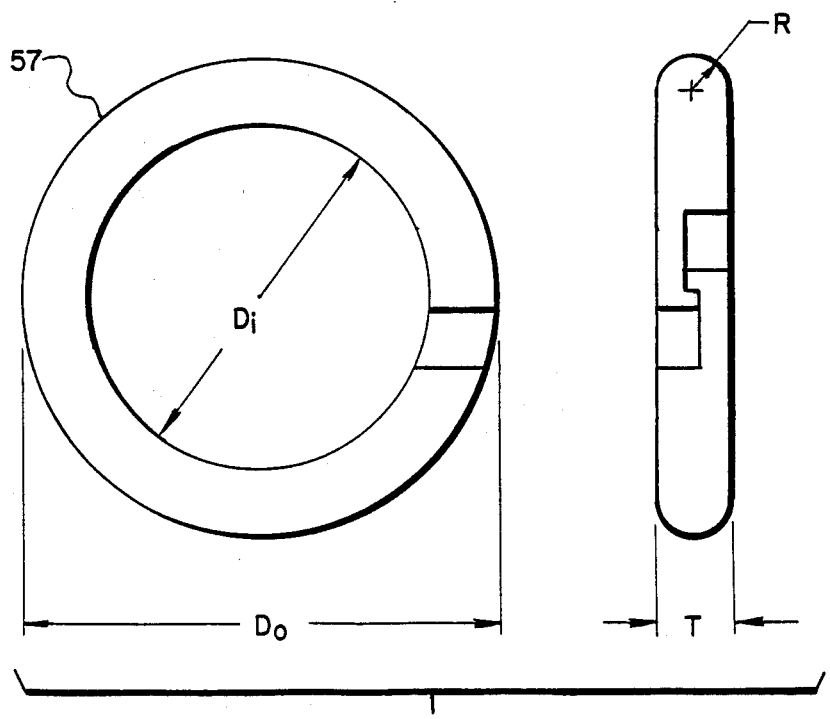
FIG. 6 is another seal means of the present invention.

Referring now to FIGS. 5 and 6, certain critical aspects of the seal means of the present invention will be more clearly understood. The figures are plan views and end views of the seal means. In accordance with the preferred embodiment depicted each of the seal means comprises a split cylindrical piston ring which has overlapping ends. Each overlapping end is provided with an axially projecting, opposing tab means which overlap and will permit radial compression of the seal means but limit the radially outward expansion. The principal difference between seal means 56 and 57, as will be seen in FIGS. 5 and 6 respectively, is that the outside periphery of seal means 57 has a spherical radius. The spherical radius R is selected to coincide with the spherical radius of the female sealing surface with which it is to be in contact, for example, surfaces 70 as shown in FIGS. 3 and 4. As to seal means 56 and 56' they are substantially identical in appearance and configuration, though the overall dimensions may differ.

In the maximum radially expanded position shown, each seal means has an outside diameter $D_0$ which is slightly greater than the inside diameter of the female portion of the duct assembly into which it is to be inserted to insure maximum sealing effectiveness about the periphery of the seal means. The inside diameter, $D_I$, is not particularly critical provided, however, that when inserted in the female duct portion the seal means is not compressed to such an extent that $D_I$ is less than diameter of the bottom portion of the recess in which it is placed. The thickness T will be selected to provide for some clearance to facilitate installation and minimize any binding within the recess in which it is to be installed. However, all of these dimensional factors are well within the skill of the artisan, the specific dimensions being a matter of design choice.

It is a particular advantage of the present invention that leakage of fluid flowing through the assembly is readily controllable to less than 0.5% of the total flow. It is a another advantage of the preferred embodiment of the invention depicted that it may be removed from the pool of liquid metal coolant for inspection, replacement of seals or the like. This is accomplished by first shutting down pump assembly 22 and removing the internal parts therefrom. After the internal parts have been removed from pump assembly 22, a grapple (not shown) may be inserted through the housing of pump assembly 22 through inlet duct 24 and connected to connecting member 50. Thereafter the entire duct assembly 28 may be pulled upwardly through the inlet duct 24 and out of pump assembly 22. Generally there would be provided some releasable latching means for maintaining duct assembly 28 in position during normal operation and releasing it for removal when desired.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a pool-type nuclear reactor, a metal duct assembly for interconnecting the discharge duct of the pump and the inlet coolant duct of a reactor core in said pool-type nucler reactor, said duct assembly comprising:
    an upper first tubular section adapted for connection to the discharge duct of said pump,
    a lower second tubular section adapted for connection with the coolant inlet duct of said reactor core,
    a third intermediate tubular section for interconnecting the other two sections,
    first and second joint means for respectively connecting one end of the intermediate section with an adjoining end of the upper section, and an opposite end of the intermediate section with an adjoining end of the lower section, each of said joint means comprising a male portion on one of said sections having a ridge adjacent and end thereof, a circumferential groove located in the ridge, the other adjacent section having a female portion adjacent its end with an inside diameter greater than that of said ridge for receiving said male portion, and
    a first seal means located in each circumferential groove, said seal means being radial compressible and having an unrestrained outside diameter greater than that of the inside diameter of the female portion such that it is maintained in contact therewith, said seal means comprising a split cylindrical ring having overlapping ends.

2. The duct assembly of claim 1 further including interlock means for limiting axial movement of said tubular sections relative to one another.

3. The duct assembly of claim 2 wherein said interlock means comprises radially inward projecting flanges on the end of said female member and a radially inward projecting shoulder in said female member for engaging the ridge portion of said male member.

4. The duct assembly of claim 1 wherein said lower second section terminates at its lower end in a male portion having a ridge adjacent thereto, said ridge having a circumferential groove, and a second seal means comprising a split cylindrical ring having overlapping ends located in said groove.

5. The duct assembly of claim 4 wherein said inlet coolant duct terminates in a vertically extending portion having radially outward flared end, said end having an internal diameter greater than that of the unrestrained diameter of said second seal means for guiding said male portion and second seal means into position and compressing said second seal means as it extends into said inlet duct.

6. The duct assembly of claim 4 wherein each of said first and second seal means has an axially projecting opposing tab means at each end for permitting radial compression of the seal means while limiting its radially outward expansion.

7. The duct assembly of claim 1 wherein the inside diameter of the female portion has a spherical sealing surface and the outside surface of each first seal means has a spherical radius.

8. The duct assembly of claim 7 wherein said lower second section terminates at its lower end in a male portion having a ridge adjacent thereto, said ridge having a circumferential groove, and a second seal means comprising a split cylindrical ring having overlapping ends located in said groove.

9. The duct assembly of claim 8 wherein said inlet coolant duct termintes in a vertically extending portion having radially outward flared end, said end having an internal diameter greater than that of the unrestrained diameter of said seal means for guiding said male portion and second seal means into position and compressing said second seal means as it extends into said inlet duct.

10. The duct assembly of claim 9 further including interlock means for limiting axial movement of said tubular sections relative to one another.

11. The duct assembly of claim 10 wherein said interlock means comprises radially inward projecting flanges on the end of said female member and a radially inward porjecting shoulder in said female member for engaging the ridge portion of said male member.

12. The duct assembly of claim 11 wherein each of said first and second seal means has an axially projecting opposing tab means at each end for permitting radial compression of the seal means while limiting its radially outward expansion.

13. In a pool-type nuclear reactor, a metal duct assembly for interconnecting the discharge duct of the pump and the inlet coolant duct of a reactor core in a pool-type nuclear reactor, said duct assembly comprising:
an upper first tubular section adapted for connection to the discharge duct of said pump,
means adjacent an upper end of said first tubular section for supporting said conduit assembly during operation of said reactor,
a lower second tubular section adapted for connetion with the coolant inlet duct of said reactor core,
a third intermediate tubular section for interconnecting the other two sections,
first and second joint means for respectively connecting one end of the intermediate section with an adjoining end of the upper section, and an opposite end of the intermedite section with an adjoining end of the lower section, each of said joint means comprising a male portion on one of said sections having a ridge adjacent an end thereof, a circumferential groove located in the ridge, the other adjacent section having a female portion adjacent its end with an inside diameter greater than that of said ridge for receiving said male portion, and
a first seal means located in each circumferential groove, said seal means being radial compressible and having an unrestrained outside diameter greater than that of the inside diameter of the female portion such that it is maintained in contact therewith, said seal means comprising a split cylindrical ring having overlapping ends.

14. The duct assembly of claim 13 wherein the inside diameter of the female portion has a spherical sealing surface and the outside surface of each first seal means has a corresponding spherical radius.

15. The duct assembly of claim 14 wherein said lower second section terminates at its lower end in a male portion having a ridge adjacent thereto, said ridge having a circumferential groove, and a second seal means comprising a split cylindrical ring having overlapping ends located in said groove.

16. The duct assembly of claim 15 wherein said inlet coolant duct terminates in a vertically extending portion having radially outward flared end, said end having an internal diameter greater than that of the unrestrained diameter of said seal means for guiding said male portion and second seal means into position and compressing said second seal means as it extends into said inlet duct.

17. The duct assembly of claim 16 further including interlock means for limiting axial movement of said tubular sections relative to one another.

18. The duct assembly of claim 17 wherein said interlock means comprises radially inward projecting flanges on the end of said female member and a radially inward projecting shoulder in said female member for engaging the ridge portion of said male member.

19. The duct assembly of claim 18 wherein each of said first and second seal means has an axially projecting opposing tab means at each end for permitting radial compression of the seal means while limiting its radially outward expansion.

* * * * *